US00RE37750E

(19) United States
(12) Reissued Patent
Itou et al.

(10) Patent Number: US RE37,750 E
(45) Date of Reissued Patent: Jun. 18, 2002

(54) CRT HAVING COLOR FILTER WITH A SPECIAL GREEN FILTER

(75) Inventors: Takeo Itou, Kumagaya; Hidemi Matsuda, Fukaya; Hajime Tanaka, Fujioka; Tomoko Nakazawa, Maebashi; Tsuyoshi Oyaizu, Fukaya, all of (JP)

(73) Assignee: Kabushiki Kaisha Toshiba, Kawasaki (JP)

(21) Appl. No.: 09/514,311

(22) Filed: Aug. 21, 2000

Related U.S. Patent Documents

Reissue of:
(64) Patent No.: 5,686,787
Issued: Nov. 11, 1997
Appl. No.: 08/671,321
Filed: Jul. 24, 1996

(30) Foreign Application Priority Data

Jul. 24, 1995 (JP) ..... 7-187339

(51) Int. Cl.[7] ..... H01J 29/10; H01J 31/00
(52) U.S. Cl. ..... 313/461; 313/474; 313/478
(58) Field of Search ..... 313/110, 112, 313/461, 467, 477 R, 478, 480; 359/577, 581, 589, 591

(56) References Cited

U.S. PATENT DOCUMENTS

| | | | | |
|---|---|---|---|---|
| 2,959,483 | A | 11/1960 | Kaplan | |
| 3,114,065 | A | 12/1963 | Kaplan | |
| 3,748,515 | A | 7/1973 | Kaplan | 313/474 X |
| 3,884,694 | A | 5/1975 | Gallaro et al. | 313/474 X |
| 3,884,695 | A | 5/1975 | Gallaro et al. | 313/474 X |
| 3,891,440 | A | 6/1975 | Gallaro et al. | 313/474 X |
| 4,135,112 | A | 1/1979 | Fisher et al. | 313/474 X |
| 4,376,829 | A | 3/1983 | Daiku | |
| 4,772,818 | A | 9/1988 | Koike et al. | |
| 5,121,030 | A | 6/1992 | Schott | 313/474 X |

FOREIGN PATENT DOCUMENTS

| | | |
|---|---|---|
| EP | 0 163 167 A2 | 8/1994 |
| EP | 0 720 291 A1 | 7/1996 |
| GB | 1 576 680 | 10/1980 |

OTHER PUBLICATIONS

Patent Abstracts of Japan, vol. 10, No. 056, Mar. 6, 1986; JP 60–199092, Aug. 1995, Takeo et al.

*Primary Examiner*—Vip Patel
*Assistant Examiner*—Mack Haynes
(74) *Attorney, Agent, or Firm*—Pillsbury Winthrop LLP

(57) ABSTRACT

A color picture tube is disclosed, that comprises an outer sheath having a electron gun, the outer sheath being air-tightly sealed, a face plate having light transmissivity and disposed on the front surface of the outer sheath, and a large number of red, blue, and green pixels regularly arranged inside the face plate, wherein the pixels have a fluorescent substance layer and a color filter, the fluorescent substance layer being lit by a radiation of an electron beam, the color filter being disposed between the fluorescent substance layer and the face palate, and wherein green pixels have a chromaticity that is plotted in the fourth quadrant of a coordinate system of a (L*a*b*) color system where a* is the horizontal axis and *b is the vertical axis when light of a standard light source C is reflected on the outside of the face plate.

6 Claims, 4 Drawing Sheets

FIG. 4

| | CONCEMTRATION OF SOLUTION FOR GREEN CELL (wt%) | | | PRODUCT CHARACTERISTICS | | TOTAL DETERMI-NATION |
|---|---|---|---|---|---|---|
| | SOLUTION OF GREEN PIGMENT | SOLUTION OF RED PIGMENT | TOTAL | BCP | BODY COLOR | |
| RELATED ART | | | | | | |
| 1 | 0 | 0 | 0 | 1.20 | x | x |
| 2 | 2 | 0 | 2 | 1.25 | △ | △ |
| 3 | 6 | 0 | 6 | 1.30 | △ | △ |
| 4 | 9 | 0 | 9 | 1.20 | x | x |
| 5 | 12 | 0 | 12 | 1.15 | x | x |
| 6 | 15 | 0 | 15 | 1.10 | x | x |
| PRESENT INVENTION | | | | | | |
| 7 | 6 | 0.06 | 6.06 | 1.31 | △ | △ |
| 8 | 6 | 0.12 | 6.12 | 1.33 | O | O |
| 9 | 6 | 0.6 | 6.6 | 1.35 | O | O |
| 10 | 6 | 1.2 | 7.2 | 1.37 | O | O |
| 11 | 6 | 2.4 | 8.4 | 1.35 | O | O |
| 12 | 6 | 3.0 | 9.0 | 1.35 | x | x |

CRT HAVING COLOR FILTER WITH A SPECIAL GREEN FILTER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a color picture tube, in particular, to a color picture tube for displaying data with high luminance and high contrast.

2. Description of the Related Art

A conventional color picture tube has a face plate that has light transmissivity and an effective display surface for displaying a picture. A fluorescent substance layer is deposited on the inner surface of the effective display surface of the face plate.

A funnel that is a hollow cone with a tube extending from the smaller rear end is disposed on the rear end of the face plate. The front end of the funnel is connected to the rear end of the face plate. Thus, a sealed vessel as a sheath of the color picture tube is formed.

An electron gun is disposed inside the rear end of the funnel. The electron gun scans and radiates an electron beam to the fluorescent substance layer corresponding to a display picture.

The path of the electron beam emitted from the electron gun is controlled by the magnetic field generated by a deflecting yoke that surrounds the electron gun so as to radiate the electron beam to a desired position of the fluorescent substance layer.

An importance factor of the characteristics of the picture display quality of the color picture tube is the brightness of the display picture. The brightness of the picture is evaluated with the luminance and the contrast ratio.

The brightness and contrast of a picture displayed on the screen and perceived by the viewer depends on not only the luminance of the picture, but the brightness of the front surface of the display screen. In other words, the brightness and contrast perceived by the viewer depends on the relation between the sum of the reflected light of the screen in non-picture display state and the perceived brightness of the fluorescent substance layer and the luminance of the display picture emitted on the fluorescent substance layer.

To improve the brightness and contrast of the display picture, the display quality can be improved.

However, with the conventional technologies, it is difficult to improve both the brightness and contrast.

In other words, when the light transmissivity of the material of the face plate is improved, since the light emitted at the fluorescent substance and transmitted to the front surface of the face plate can be effectively used, the picture is brightly perceived.

However, due to the lightness of the fluorescent substance layer in the non-emitting state, when a picture is not displayed, the brightness of the face plate composed of the material with high light transmissivity is high.

The contrast of a picture displayed by light emitted from the fluorescent substrate layer depends on the brightness of the screen in the non-picture display state. Thus, the brightness of the screen in the non-picture display state is reversely proportional to the contrast characteristics. Since the color of the fluorescent substance layer is normally a white type, the lightness thereof is very high.

Thus, in the conventional color picture tube, to improve the luminance, the drive voltage of the color picture tube is increased and thereby the energy of the electron beam is increased so as to improve the luminance of the light emitted by the fluorescent substance.

On the other hand, to improve the contrast characteristics, a colored glass is used as the material of the face plate so as to decrease the light transmissivity to 40% or more. Thus, the brightness of the screen in the non-picture display state is suppressed. Alternatively, a pigment is mixed with the material of the fluorescent substance layer so as to darken the color of the fluorescent substance layer.

However, when the energy of the electron beam is increased, the current consumption of the color picture tube increases. Thus, the power consumption of the color display apparatus increases. From this point of view, it is not preferable to increase the energy of the electron beam.

On the other hand, when the colored glass is used for the material of the face plate and thereby the light transmissivity is decreased to 40% or less, since the reflection of the external light decreased reversely proportional to the square of the light transmissivity, the contrast characteristics are improved. However, due to the low transmissivity of the face plate, the transmissivity of the light that is emitted from the fluorescent substance layer and imaged through the face plate is decreased to 40% or less. Thus, the luminance of the display picture remarkably decreases.

In the case of a flat type color picture tube of which the glass wall thickness of the face plate peripherally increases with a predetermined change ratio, since the light absorbing ratio at the peripheral portion with large all thickness is high, the luminance of the picture at the peripheral portion is remarkably different from that at the center portion.

Practically, it is very difficult to equalize the wall thickness of the entire face plate of the flat type color picture tube. This is because the shape of the inner shadow mask, the scanning method of the electron beam, and the fabrication method of the entire color picture tube should be changed.

When a pigment is mixed with the material of the fluorescent substance layer and thereby the color of the fluorescent substance layer is darkened, since the pigment is not a fluorescent substance, the ratio of the substance that does not contribute to the light emission increases in the fluorescent substance layer. Thus, the light emitting performance of the fluorescent substance layer decreases and thereby the luminance of the display picture decreases.

Alternatively, the voltage for emitting the electron beam from the electron gun is increased and thereby the energy of the electron beam is increased so as to increase the light emission of the fluorescent substance layer. However, in this case, the power consumption increases. In addition, the voltage for deflecting the electron beam with high energy increases. Thus, the total power consumption of the color picture tube remarkably increases.

A surface coat may be deposited on the outer surface of the face plate so as to prevent the external light from reflecting. However, with this method, a good result cannot be obtained.

To solve such a problem, a technology for disposing a color filter layer between the inner surface of the face plate and the fluorescent substance layer has been proposed and is becoming popular.

The color filter layer has many color cells corresponding to fluorescent substance dots or fluorescent substance stripes corresponding to pixels. The color cells transmit only emitted color light or respective pixels. The color filter layer transmits only emitted light corresponding to each pixel. In addition, the color filter layer prevents external light from reflecting at the interface between the fluorescent substance layer and the face plate. Thus, it is said that with such a color filter layer, the contrast characteristics can be effectively improved without a decrease of the chromaticity of bright points of each color of the screen (namely, the purity of the colors) and a decrease of the luminance.

However, since the color filter layer is disposed inner surface of the face plate, the color filter layer should be composed of an inorganic pigment whose material withstands the inner environment of the color picture tube and the heating process at a temperature of around 500° C. Nevertheless, the filter performance of the color filter layer composed of such an inorganic pigment is not satisfactory.

In other words, for pigments used for red cells and blue cells, with $Fe_2O_3$ particles and $Al_2O_3$—CoO particles, desired characteristics can be obtained with conventional technologies.

However, a pigment for green cells that satisfies such characteristics is not known. In other words, with conventional pigments for green cells, satisfactory selective absorbing characteristics cannot be accomplished (namely, good coloring characteristics cannot be accomplished). When a picture is displayed on the color picture tube with such green cells, the green cannot be correctly displayed. Instead, bluish green is displayed. Thus, the body color cannot be properly displayed.

Therefore, although the white is created mixing the three primary colors, it is difficult to display the white with high purity.

On the other hand, to obtain good coloring characteristics, a color filter with high concentration is required. However, in this case, even if the coloring characteristics are satisfactory, since the light transmissivity decreases and thereby the contrast characteristics (BCP) deteriorates.

As described above, with the conventional technologies, it is very difficult to satisfactorily improve the luminance of the effective display screen, the contrast characteristics, and the coloring characteristics of each color including green.

SUMMARY OF THE INVENTION

An object of the present invention is to provide a color picture tube for satisfactorily improving the luminance of the effective display screen, the contrast characteristics, and the coloring characteristics of each color including green of the display picture so as to accomplish a high quality picture display.

The present invention is a color picture tube, comprising an outer sheath having an electron gun, the outer sheath being airtightly sealed, a face plate having light transmissivity and disposed on the front surface of the outer sheath, and a large number of red, blue, and green pixels regularly arranged inside the face plate, wherein the pixels have a fluorescent substance layer and a color filter, the fluorescent substance layer being lit by a radiation of an electron beam, the color filter being disposed between the fluorescent substance layer and the face palate, and wherein green pixels have a chromaticity that is plotted in the [fourth quadrant of] *second quadrant of* a coordinate system of a (L*a*b*) color system where (*represents lightness, a* is the horizontal axis and *b is the vertical axis when light of a standard light source C is reflected on the outside of the face plate.

The green pixels has a chromaticity that is plotted on a coordinate system of a (L*a*b*) color system where a* is the horizontal axis and *b is the vertical axis so that the following relation is satisfied.

$$b^* \leqq (-8/3)\alpha^*$$

The green pixels has a chromaticity that is plotted on a coordinate system of a (L*a*b*) color system where a* is the horizontal axis and *b is the vertical axis so that the following relation is satisfied.

$$b^* \leqq (-6/5)\alpha^*$$

The present invention is a color picture tube, comprising a face plate that has a light transmissivity and has an effective display surface for displaying a picture, a funnel, the front end of the funnel being connected to 19 the rear end of the face plate, the rear end of the funnel being narrow, the funnel being airtightly sealed as a sheath of the color picture tube, a fluorescent substance layer coated on the inner surface of the effective display surface of the face plate, the fluorescent substance layer having color fluorescent substances corresponding to red, blue, and green pixels, a color filter disposed between the face plate and the fluorescent substance layer and having color cells corresponding to the red, blue, and green pixels, and an electron gun disposed at the rear end of the funnel and adapted for radiating an electron beam to the fluorescent substance layer corresponding to a display picture, wherein the color cells corresponding to the green fluorescent substance of the color filter include a pigment that is a mixture of $Fe_2O_3$ particles and at least one selected from the group consisting of $TiO_2$—NiO—CoO—ZnO particles, CoO—$Al_2O_3$—$Cr_2O_3$—$TiO_2$ particles, and CoO—$Al_2O_3$—$Cr_2O_3$ particles.

The color cells corresponding to the red fluorescent substances of the color filter include $Fe_2O$ particles as a pigment.

The color cells corresponding to the blue fluorescent substance of the color filter include $Al_2O_3$—CoO particles are a pigment.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 4 is a table showing experimental results for comparing contrast characteristics (BCP) and coloring characteristics of a body color of the color picture tube according to the present invention with those of conventional color picture tubes.

DETAILED DESCRIPTION OF THE PREFERRED EMBODIMENTS

With reference to the accompanying drawings, a color picture tube according to an embodiment of the present invention will be described in detail.

Figure 1:
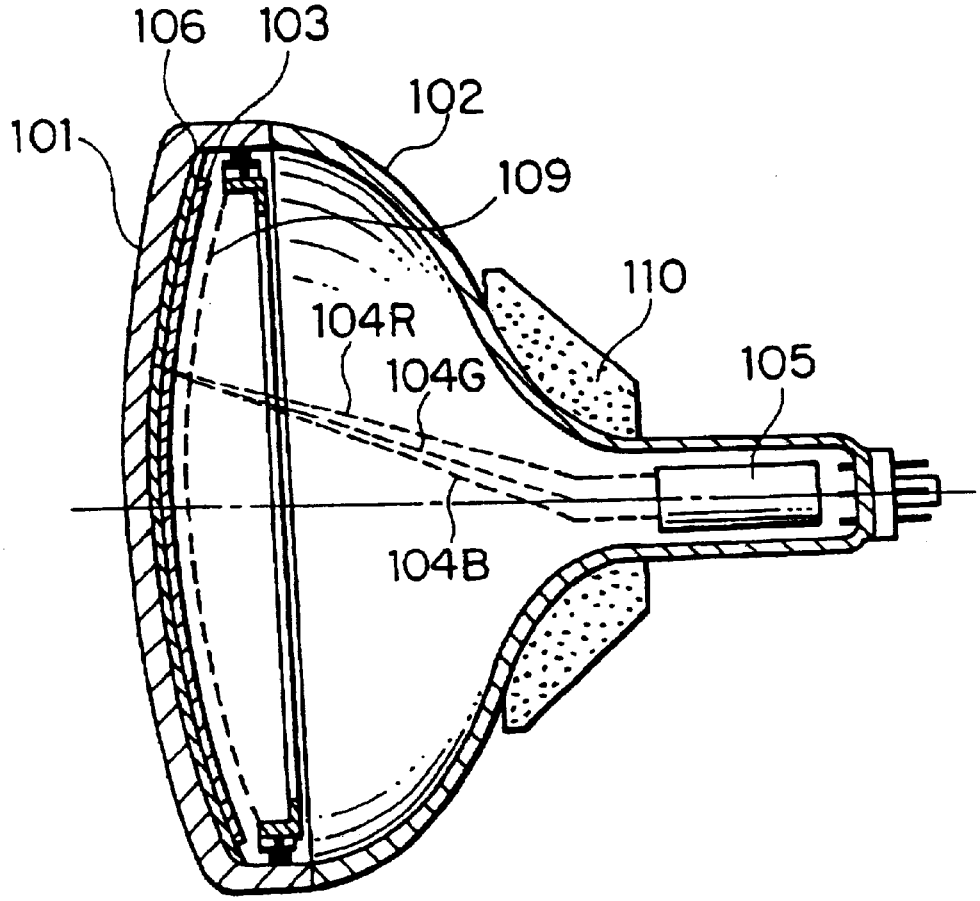
FIG. 1 is a sectional view showing an outlined structure of a color picture tube according to the present invention.

As shown in FIG. 1, a color picture tube 100 has a face plate 101 that has light transmissivity of 60% or more and that has an effective display surface for displaying a picture. The glass wall thickness of the face plate 101 radially increases with a predetermined change ratio. A funnel 102 that is a hollow cone with a tube extending from the smaller rear end is disposed on the rear end of the face plate 101. The front end of the funnel 102 is connected to the rear end of the face plate 101. Thus, a sealed vessel as a sheath of the color picture tube is formed.

A fluorescent substance layer 103 is formed on the inner surface of the effective display surface of the face plate 101.

An electric gun 105 is disposed inside the rear end of the funnel 102. The electron gun 105 scans and radiates an electron beam to the fluorescent substance layer 103 corresponding to the display picture.

Figure 2:
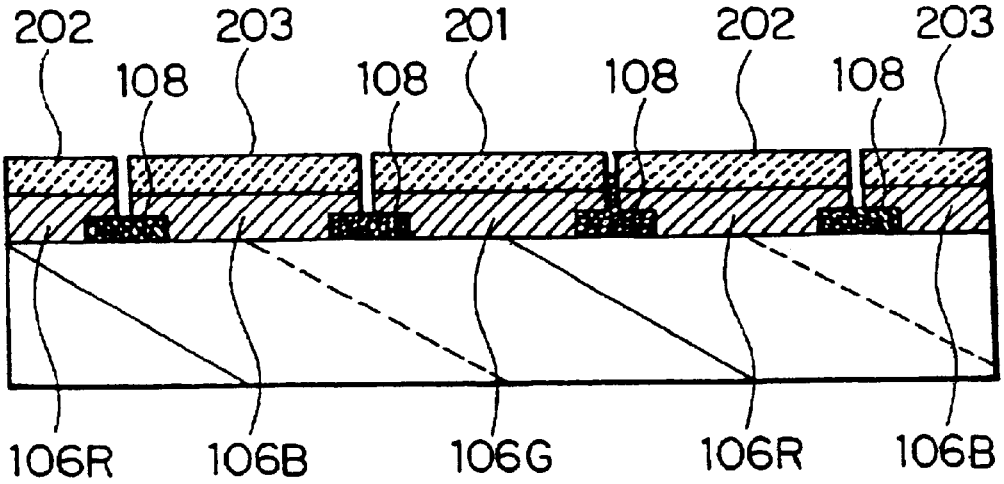
FIG. 2 is a partially enlarged sectional view showing the structure of an effective display surface of a face plate of the color picture tube according to the present invention.

A color filter layer 106 is disposed between the face plate 101 and the fluorescent substance layer 103. As shown in FIG. 2, the color filter layer 106 has color cells 106B, 106G, and 106R corresponding to colors of pixels. A black matrix 108 is formed between adjacent cells. The black matrix 108 is composed of a black pigment.

A shadow mask 109 is formed inside the face plate 101. The shadow mask 109 has electron beam holes corresponding to pixels of the fluorescent substance layer 103. In addition, a deflecting yoke 110 is disposed outside the narrow portion of the funnel 102.

Figure 3:
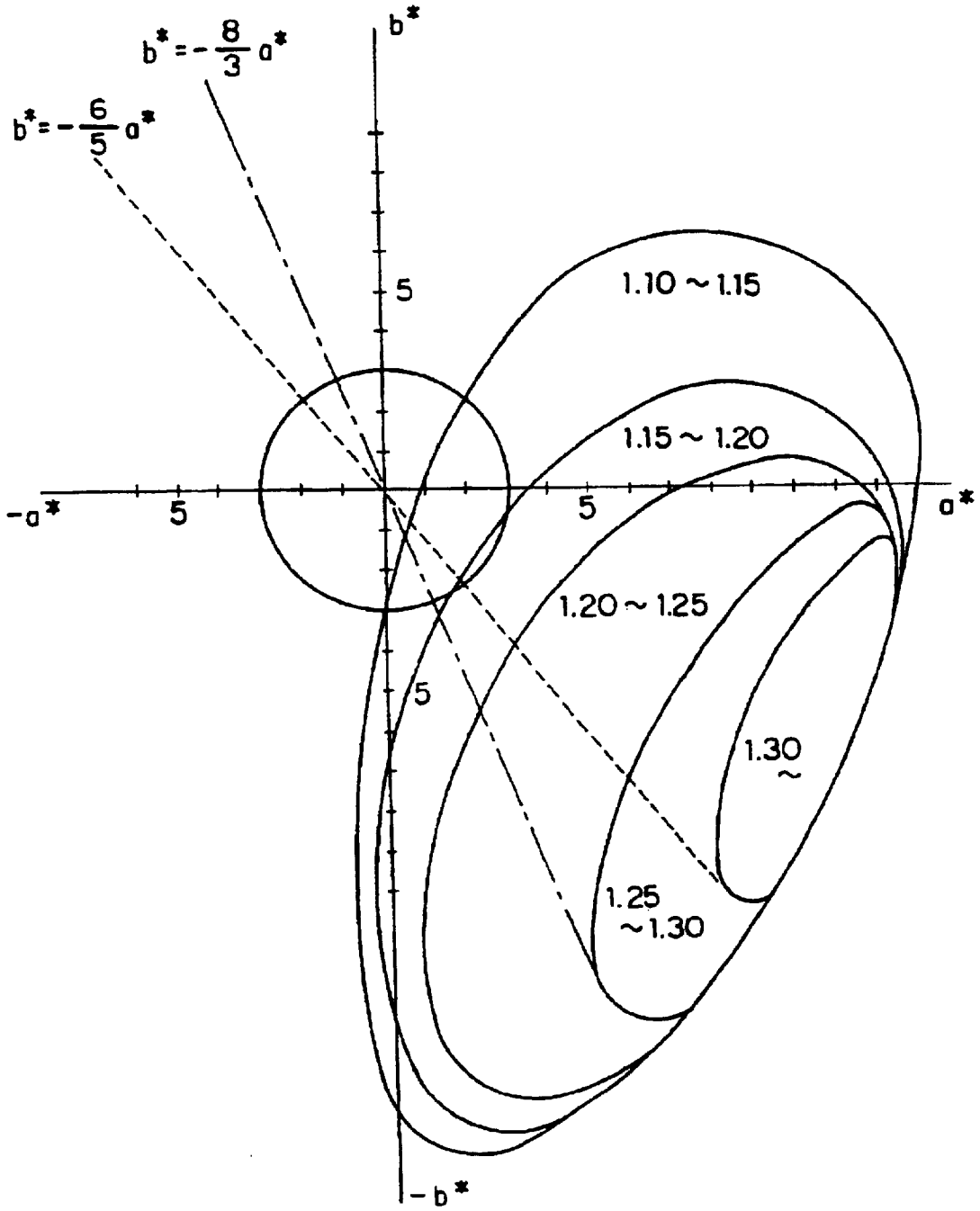
FIG. 3 is a graph showing the relation between a body color (generated by blue pixels and red pixels) and BCP in a coordinate system of a (L*a*b*) color system (where a* is the horizontal axis and b* is the vertical axis), the concentration of a blue filter and a red filter of the color picture tube being varied.

FIG. 3 is a graph showing the relation between a body color (generated by blue pixels and red pixels) and BCP in a coordinate system of CIE1976 (L*a*b*) color system (where a* is the horizontal axis and b* is the vertical axis), the concentration of a blue filter and red filter of the color picture tube being varied. The CIE1976 (L*a*b*) color system is hereinafter merely referred to as (L*a*b*) color system. The reference light source used for measuring the body color is (CIE) standard light source C.

BCP is expressed by the following formula.

$$BCP=(Br'/Br)/(Rf/Rf)^{1/2}$$

where Br is the luminance of the color picture tube that does not have a filter; Rf is the external light reflecting ratio thereof; Br' is the luminance of the color picture tube that has a filter; and Rf' is the external reflecting ratio thereof.

It is said that the efficiency of the color picture tube that has a filter is proportional to the value of BCP.

As shown in FIG. 3, when the concentrations of the blue and red filters are varied, the region of the body color (generated by blue pixels and red pixels) of which the value of BCP is 1.20 or more is plotted partly in the [second] *fourth* quadrant of the (L*a*b*) color system where a* is the horizontal axis and b* is the vertical axis. In addition, the region of which the value of BCP is 1.25 or more and the region of which the value of BCP is 1.30 or more are plotted partly in the [second quadrant.] *fourth quadrant.*

On the other hand, when the value of BCP is 1.10 or more, the region extends to a part of the first quadrant.

When the body color of the color picture tube is colored, the black portion of the display picture is adversely colored. Thus, the body color of the color picture tube is preferably achromatic.

In the graph shown in FIG. 3, the origin of the graph is achromatic. It is experimentally known that when the body color (generated by red pixels, green pixels, and blue pixels) is in a circle with radius =3 (the circle shown in FIG. 3), the black output of a real color picture tube is perceived as achromatic.

Thus, as shown in FIG. 3, to obtain a good value (at least 1.20 or more) of BCP with a blue filter and a red filter, when the body color is placed in the circle with radius =3, the chromaticity of green pixels should be placed in the [fourth] *second* quadrant shown in FIG. 3.

Likewise, to obtain BCP=1.25 or more, the chromaticity of green pixels should be placed in a region between lines b* =−(8/3)a* and a* shown in FIG. 3. In other words, the chromaticity of green pixels should be placed in the region that satisfies both the [fourth] *second* quadrant and b*≦−(8/3)a*.

To obtain BCP=1.30 or more, the chromaticity of green pixels should be placed in a region between lines b*=−(6/5)a* and a* shown in FIG. 3. In other words, the chromaticity of green pixels should be placed in the region that satisfies both the [fourth] *second* quadrant and b*≦(6/5)a*.

To obtain the above-described chromaticity of green pixels, the chromaticity of the color filter for the green pixels should be adjusted. Thus, a color picture tube that satisfactorily improves the luminance of the effective display screen, the contrast characteristics, the coloring characteristics of each color including green of display picture, and high quality display can be provided.

In this embodiment, to satisfy the above-described conditions, the fluorescent substance layer 103, the color filter layer, and so forth are structured as follows.

The black matrix 108 is composed of black particles such as graphite particles whose average particle size ranges from 0.2 to 5 μm as a black pigment.

The material of the fluorescent substance dot 201 for the green (G) pixel of the fluorescent substance layer 103 is [Zn:Cu:Al.] *ZnS:Cu:Al.* The material of the fluorescent substance dot 202 for the red (R) pixel is [$Y_2O_2$:S:Eu]. The material of the fluorescent substance dot 203 of the blue (B) pixel is ZnS:Ag:Al.

The film thickness of the color filter layer 106 is in the range from 0.05 to 1 μm. The cells 106B, 106G, and 106R are composed of the following pigments.

The color cell 106G for the green pixel is composed of a mixture of a green pigment CoO—$Cr_2O_3$—$TiO_2$—$Al_2O_3$ (average particle size=105 nm) and a red pigment $Fe_2O_3$ (average particle size=75 nm) with a mixing ratio (green pigment/red pigment)=50.

When the green pigment CoO—$Cr_2O_3$—$TiO_2$—[$Al_2O$ is] $Al_2O_3$ is mixed with a small amount of the red pigment $Fe_2O_3$, the color of the color cell 106G becomes yellowish green. In other words, in the graph shown in FIG. 3, a yellow component (+b*) is added to the green component (−a*). The resultant color has a chromaticity plotted in the [fourth] *second* quadrant. The body color of the green pixel depends on the color cell 106G, the fluorescent substance dot 201 for the green (G) pixel, and the face plate 101. In the present invention, the real body color of the green pixel has a chromaticity plotted in the [fourth quadrant.] *second quadrant.*

The color cell 106R for the red pixel is composed of a red pigment $Fe_2O_3$ (average particle size =75 nm).

The color cell 106B for the blue pixel is composed of a blue pigment CoO.$Al_2$.$O_3$ (average particle size =107 nm).

The pigments for these colors are inorganic pigments that withstand the temperature condition of the fabrication process of the color picture tube.

It should be noted that the pigments for these color cells of the color filter layer 106 according to the present invention are not limited to the above-described pigments.

Examples of the inorganic green pigment are Daipyroxide TM-Green #3340 (trade name; particle size: 0.01 to 0.02

μm; available from DAINICHISEIKA COLOUR & CHEMICALS MFG. CO., LTD.) as a $CoO—Cr_2O_3—TiO_2—Al_2O_3$ pigment and Dipyroxide TM-green #3420 (trade name; particle size: 0.01 to 0.02 μm; available from DAINICHISEIKA COLOUR & CHEMICALS MFG. CO., LTD.) as a $TiO_2—NiO—CoO—ZnO$ pigment.

A preferable example of the inorganic red pigment is Sicotrans Red L-2817 (trade name; particle size: 0.01 to 0.02 μm; available from BASF) as a ferric oxide pigment.

An example of the inorganic blue pigment is Cobalt Blue X (trade name; particle size: 0.01 to 0.02 μm; available from Toyo Ganryo) as a cobalt aluminate ($Al_2O_3—CoO$) pigment.

A picture was displayed on the color picture tube with the color filter layer 106 according to the present invention. Experiments for comparing the contrast characteristics (BCP) and the coloring characteristics of the body color with those of a conventional color picture tube were performed. FIG. 4 shows the experimental results.

Figure 5:
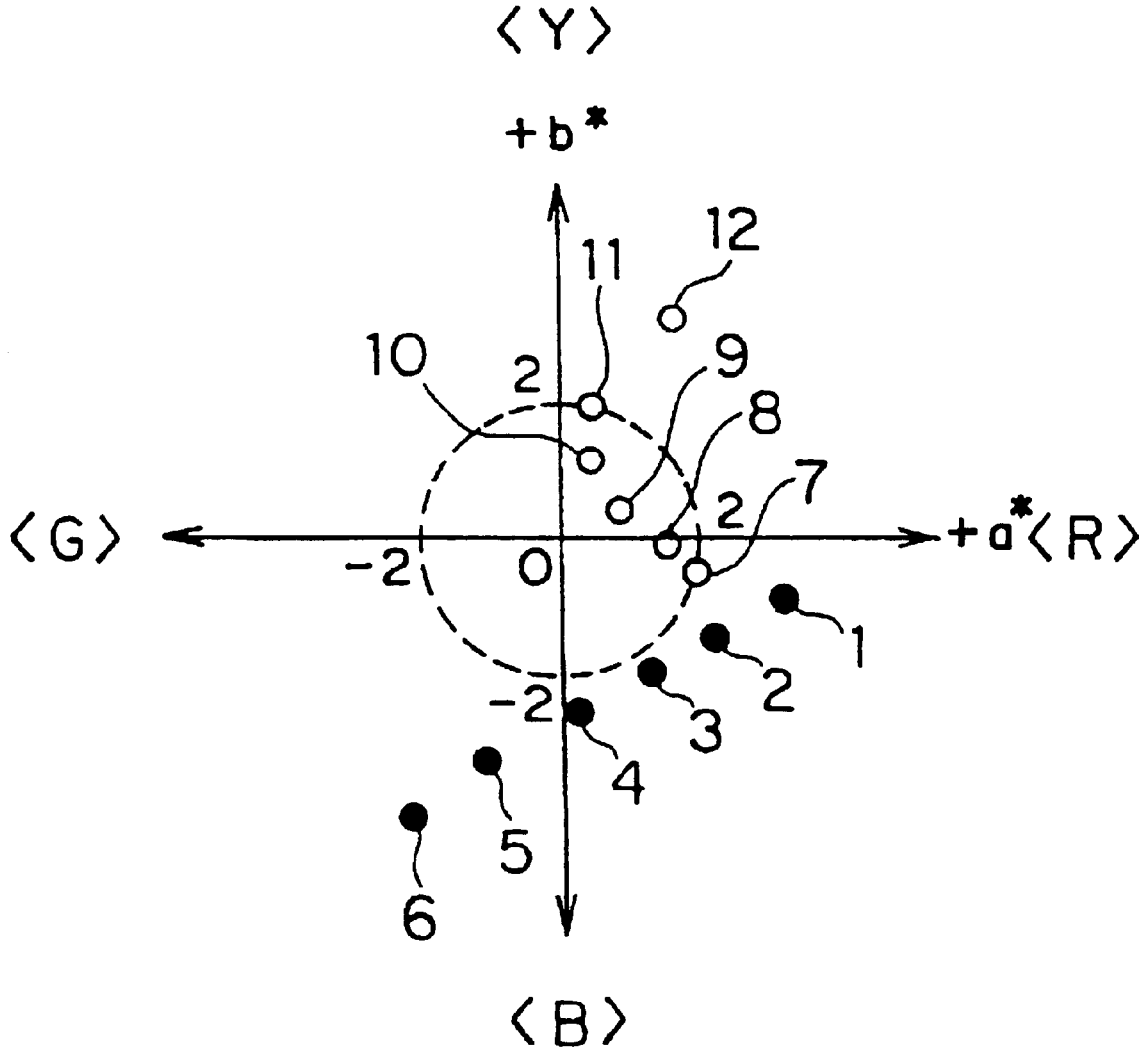
FIG. 5 is a graph showing plots on a color chart of experimental results of the contrast characteristics and the coloring characteristics of FIG. 4.

FIG. 5 is a graph showing plots on a color chart of experimental results of the contrast characteristics and the coloring characteristics of FIG. 4.

In FIG. 4, samples 1 to 6 represent experimental results of the conventional color picture tube, whereas samples 7 to 12 represent experimental results of the color picture tube according to the present invention. In each group, the mixing ratio to pigments was changed in six types so as to obtain resultant BCP and coloring characteristics.

As the results, in the conventional color picture tube of which no red pigment was mixed with a green pigment, the value of BCP was at most 1.3 (sample 3). In addition, in the sample 3, the coloring characteristics of the body color were slightly bad. In other samples 1, 2, 4, and 5, both BCP and coloring characteristics were low.

In contrast, in the color picture tube according to the present invention (samples 7 to 11), the value of BCP was 1.3 or more. In addition, the coloring characteristics of the body color were balanced and very good. However, in the sample 12 of which a red pigment of 9 weight % was mixed, although the value of BCP was 1.3 or more, the coloring characteristics of the body color were low.

The experimental results show that when the red pigment is excessively mixed as in the sample 12, depending on the relation with the green pigment and other conditions of the color filter such as absorbing characteristics and film thickness, the balance of the body color may deviate in the red direction. Thus, at least in the conditions of the embodiment, it seems that the mixing ratio of the red pigment is preferably 3 weight % or less. On the other hand, as the lower limit, when the mixing ratio of the red pigment is smaller than that of the sample 7, PCB and coloring characteristics are deteriorated as with those of the sample 6. Thus, it seems that the lower limit of the mixing ratio of the red pigment is 0.06 weight % or more in the conditions of the embodiment.

As a criterion for determining the coloring characteristics of the body color in the experiments of the embodiment, as with the case shown in FIG. 3, a color chart was used. On the color chart, experimental results were plotted in the coordinate system of the (L*a*b*) color system shown in FIG. 5 (where a* is the horizontal axis and b* is the vertical axis). In other words, the balance of the coloring characteristics was determined corresponding to the position of the coloring characteristics of each sample on the chart.

The samples plotted in a circle with radius =2 in the coordinate system shown in FIG. 5 were determined as good samples of which coloring characteristics were well balanced. In FIG. 5, plots with white circles represent samples 7 to 12 of the color picture tube according to the present invention. Plots with black circles represent samples 1 to 6 of the conventional color picture tube. Numbers assigned dots represents samples.

As with the measured results shown in FIG. 3, the measured results shown in FIG. 5 represent the chromaticity of reflected light in the case that light of a standard light source C that is a reference light source (CIE) is radiated from the outside of the face plate.

As is clear from FIG. 5, in the samples 1 to 6 of the conventional color picture tube, the chromaticity largely deviates from the B (blue) direction to the G (green) direction or the R (red) direction. On the other hand, in the samples 7 to 11 of the color picture tube according to the present invention, the chromaticity is placed in the circle with radius =2. However, the chromaticity of the sample 12 largely deviates in the R (red) direction and the Y (yellow) direction.

As described above, the experimental results show that the color picture tube according to the present invention has excellent contrast characteristics measured with BCP and coloring characteristics determined by a color chart.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A color picture tube, comprising:

a funnel having a neck portion;

an electron gun disposed in said neck portion a light transmissive face plate disposed as a front surface of said funnel, said funnel and face plate forming an outer sheath of said tube that is airtightly sealed; and a large number of red, blue, and green pixels regularly arranged inside said face plate, wherein the pixels have a fluorescent substance layer and a color filter, the fluorescent substance layer being lit by a radiation of an electron beam, the color filter being disposed between the fluorescent substance layer and said face plate, and wherein the green pixels have a chromaticity that is plotted in the [fourth quadrant of a coordinate system of] *second quadrant of a coordinate system of* a (L*a*b*) color system where L* represents lightness, a* is the horizontal axis and b* is the vertical axis when light of a standard light source C is reflected on the outside of said face plate.

2. The color picture tube as set forth in claim 1, wherein the green pixels has a chromaticity that is plotted on a coordinate system of a (L*a*b*) color system where L* represents light a* is the horizontal axis and b* is the vertical axis so that the following relation is satisfied:

$$b^* \leqq (-8/3)\alpha^*.$$

3. The color picture tube as set forth in claim 1, wherein the green pixels has a chromaticity that is plotted on a coordinate system of a (L*a*b*) color system where L* represents light a* is the horizontal axis and B* is the vertical axis so that the following relation is satisfied:

$$b^* \leqq (-6/5)\alpha^*.$$

4. A color picture tube, comprising:

a light transmissive face plate having an effective display surface for displaying a picture;

a funnel, the front end of which is connected to the rear end of said face plate, the rear end of said funnel being narrow, said funnel being airtightly sealed with said face plate as a sheath of the color picture tube;

a fluorescent substance layer coated on the inner surface of the effective display surface of said face plate, said fluorescent substance layer having color fluorescent substances corresponding to red, blue, and green pixels;

a color filter disposed between said face plate and said fluorescent substance layer and having color cells corresponding to the red, blue, and green pixels; and an electron gun disposed at the rear end of said funnel and adapted for radiating an electron beam to said fluorescent substance layer corresponding to a display picture, wherein the color cells corresponding to the green fluorescent substance of said color filter include a pigment that is a mixture of $Fe_2O_3$ particles and at least one selected from the group consisting of $TiO_2$—NiO—CoO—ZnO particles, CoO—$Al_2O_3$—$Cr_2O_3$—$TiO_2$ particles, and CoO—$Al_2O_3$—$Cr_2O_3$ particles.

5. The color picture tube as set forth in claim 4, wherein the color cells corresponding to the red fluorescent substances of said color filter include $Fe_2O_3$ particles as a pigment.

6. The color picture tube as set forth in claim 4, wherein the color cells corresponding to the blue fluorescent substance of said color filter include $Al_2O_3$—CoO particles as a pigment.

* * * * *

UNITED STATES PATENT AND TRADEMARK OFFICE

CERTIFICATE OF CORRECTION

PATENT NO. : RE 37,750 E
DATED : June 18, 2002
INVENTOR(S) : Itou et al.

It is certified that error appears in the above-identified patent and that said Letters Patent is hereby corrected as shown below:

Title page,
Item [57], should read:

-- [57] ABSTRACT

A color picture tube is disclosed, that comprises an outer sheath having a electron gun, the outer sheath being airtightly sealed, a face plate having light transmissivity and disposed on the front surface of the outer sheath, and a large number of red, bue, and green pixels regularly arranged inside the face plate, wherein the pixels have a fluorescent substance layer and a color filter, the fluorescent substance layer being lit by a radiation of an electron beam, the color filter being disposed between the fluorescent substance layer and the face plate, and wherein green pixels have a chromaticity that is plotted in the second quadrant of a coordinate system of a (L*a*b*) color system where a * is the horizontal axis and *b is the vertical axis when light of a standard light source C is reflected on the outside of the face plate. --

Signed and Sealed this

Eleventh Day of February, 2003

JAMES E. ROGAN
*Director of the United States Patent and Trademark Office*